(12) United States Patent
Tatiparthi et al.

(10) Patent No.: US 11,768,743 B2
(45) Date of Patent: Sep. 26, 2023

(54) SYSTEM AND METHOD FOR DYNAMICALLY ADJUSTING RECOVERY TIME OBJECTIVE IN A VIRTUAL COMPUTING SYSTEM

(71) Applicant: Nutanix, Inc., San Jose, CA (US)

(72) Inventors: Kiran Tatiparthi, Dublin, CA (US); Ankush Jindal, Bangalore (IN); Monil Devang Shah, Mumbai (IN); Mukul Sharma, San Jose, CA (US); Shubham Gupta, Karnataka (IN); Sharad Maheshwari, Varthur (IN); Kilol Surjan, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 405 days.

(21) Appl. No.: 16/942,593

(22) Filed: Jul. 29, 2020

(65) Prior Publication Data

US 2021/0382797 A1 Dec. 9, 2021

Related U.S. Application Data

(60) Provisional application No. 63/035,429, filed on Jun. 5, 2020.

(51) Int. Cl.
*G06F 9/455* (2018.01)
*G06F 11/14* (2006.01)
*G06F 11/20* (2006.01)

(52) U.S. Cl.
CPC ...... *G06F 11/1484* (2013.01); *G06F 9/45558* (2013.01); *G06F 11/203* (2013.01); *G06F 11/2074* (2013.01); *G06F 11/2076* (2013.01); *G06F 2009/4557* (2013.01); *G06F 2009/45591* (2013.01)

(58) Field of Classification Search
CPC ......... G06F 9/45558; G06F 2009/4557; G06F 2009/45591; G06F 2201/81; G06F 2201/815
See application file for complete search history.

(56) References Cited

U.S. PATENT DOCUMENTS

| 7,979,652 B1 * | 7/2011 | Sivasubramanian ...................... G06F 11/2094 711/141 |
|---|---|---|
| 8,332,687 B1 | 12/2012 | Natanzon et al. |
| 8,341,115 B1 | 12/2012 | Natanzon et al. |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Lewis A Bullock, Jr.
*Assistant Examiner* — Kevin X Lu
(74) *Attorney, Agent, or Firm* — Foley & Lardner LLP

(57) ABSTRACT

A system and method include migrating, by a migration controller, a first entity of a first subset of entities from a source site to a target site in a virtual computing system based on an asynchronous mode of replication. The system and method also include replicating, by the migration controller, data of a second entity of a second subset of entities from the source site to the target site based on a synchronous mode of replication in parallel with the migration of the first entity for dynamically adjusting a recovery time objective parameter.

20 Claims, 4 Drawing Sheets

(56) References Cited

U.S. PATENT DOCUMENTS

| | | | |
|---|---|---|---|
| 8,549,518 | B1 | 10/2013 | Aron et al. |
| 8,850,130 | B1 | 9/2014 | Aron et al. |
| 9,313,270 | B2 | 4/2016 | Joshi |
| 9,448,894 | B1* | 9/2016 | Barcello ............... G06F 16/25 |
| 9,639,592 | B1 | 5/2017 | Natanzon et al. |
| 9,766,930 | B2 | 9/2017 | Tarasuk-Levin et al. |
| 10,944,822 | B2 | 3/2021 | Thomas et al. |
| 11,061,603 | B1* | 7/2021 | Bankar ............... G06F 3/0614 |
| 11,372,686 | B1* | 6/2022 | Vig ............... G06F 9/5072 |
| 2015/0379107 | A1 | 12/2015 | Rank et al. |
| 2016/0188232 | A1* | 6/2016 | Ramachandran ..... G06F 3/0619 711/162 |
| 2018/0102880 | A1* | 4/2018 | Xu ............... H04W 72/04 |
| 2020/0233582 | A1* | 7/2020 | Chen ............... G06F 3/065 |
| 2020/0341641 | A1* | 10/2020 | Kucherov ............... G06F 3/0604 |
| 2020/0387575 | A1* | 12/2020 | Palekar ............... G06F 12/0868 |
| 2021/0034484 | A1* | 2/2021 | Meiri ............... G06F 13/28 |
| 2021/0103508 | A1* | 4/2021 | Chen ............... G06F 11/2069 |
| 2021/0165710 | A1* | 6/2021 | Wolfson ............... G06F 11/0751 |
| 2022/0229734 | A1* | 7/2022 | Seela ............... G06F 11/1461 |

OTHER PUBLICATIONS

Natanzon, Assaf et al., "Dynamic synchronous/asynchronous replication" ACM Transactions on Storage (TOS 2013), published Aug. 2013, p. 8, vol. 9, No. 3, retrieved from https://doi.org/10.1145/2508011.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Tintri by DNN "What is Synchronous Replication?" Tintri FAQ's, (accessed Jan. 16, 2020) from https://www.tintri.com/faqs/what-is-synchronous-replication (published 2020).

* cited by examiner

SYSTEM AND METHOD FOR DYNAMICALLY ADJUSTING RECOVERY TIME OBJECTIVE IN A VIRTUAL COMPUTING SYSTEM

CROSS REFERENCE TO RELATED APPLICATIONS

This application claims priority from U.S. Provisional Application No. 63/035,429, filed on Jun. 5, 2020, the entirety of which is incorporated by reference herein.

BACKGROUND

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, a virtual machine or another entity may be migrated from a source site to a target site. However, current mechanisms of such migration are limited in the way those mechanisms are configured and how they operate.

SUMMARY

In accordance with some aspects of the present disclosure, a method is disclosed. The method includes migrating, by a migration controller, a first entity of a first subset of entities from a source site to a target site in a virtual computing system based on an asynchronous mode of replication. The method also includes replicating, by the migration controller, data of a second entity of a second subset of entities from the source site to the target site based on a synchronous mode of replication in parallel with the migration of the first entity for dynamically adjusting a recovery time objective parameter.

In accordance with yet other aspects of the present disclosure, a system is disclosed. The system includes a migration controller having a memory having computer-readable instructions stored thereon and a processor that executes the computer-readable instructions to migrate a first entity of a first subset of entities from a source site to a target site in a virtual computing system based on an asynchronous mode of replication and replicate data of a second entity of a second subset of entities from the source site to the target site based on a synchronous mode of replication in parallel with the migration of the first entity for dynamically adjusting a recovery time objective parameter.

In accordance with some other aspects of the present disclosure, a non-transitory computer-readable media having computer-readable instructions is disclosed. The computer-readable instructions when executed by a processor in a virtual computing system cause the processor to migrate a first entity of a first subset of entities from a source site to a target site in a virtual computing system based on an asynchronous mode of replication and replicate data of a second entity of a second subset of entities from the source site to the target site based on a synchronous mode of replication in parallel with the migration of the first entity for dynamically adjusting a recovery time objective parameter.

In accordance with some more aspects of the present disclosure, a method is disclosed. The method includes receiving a request to migrate a virtual machine from a first host machine to a second host machine, the virtual machine being associated with a first memory and a second memory on the first host machine and with a third memory and a fourth memory on the second host machine, copying first data from the first memory directly to the third memory for migrating the virtual machine, and copying second data from the second memory directly to the fourth memory without copying the second data to the first memory for migrating the virtual machine.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
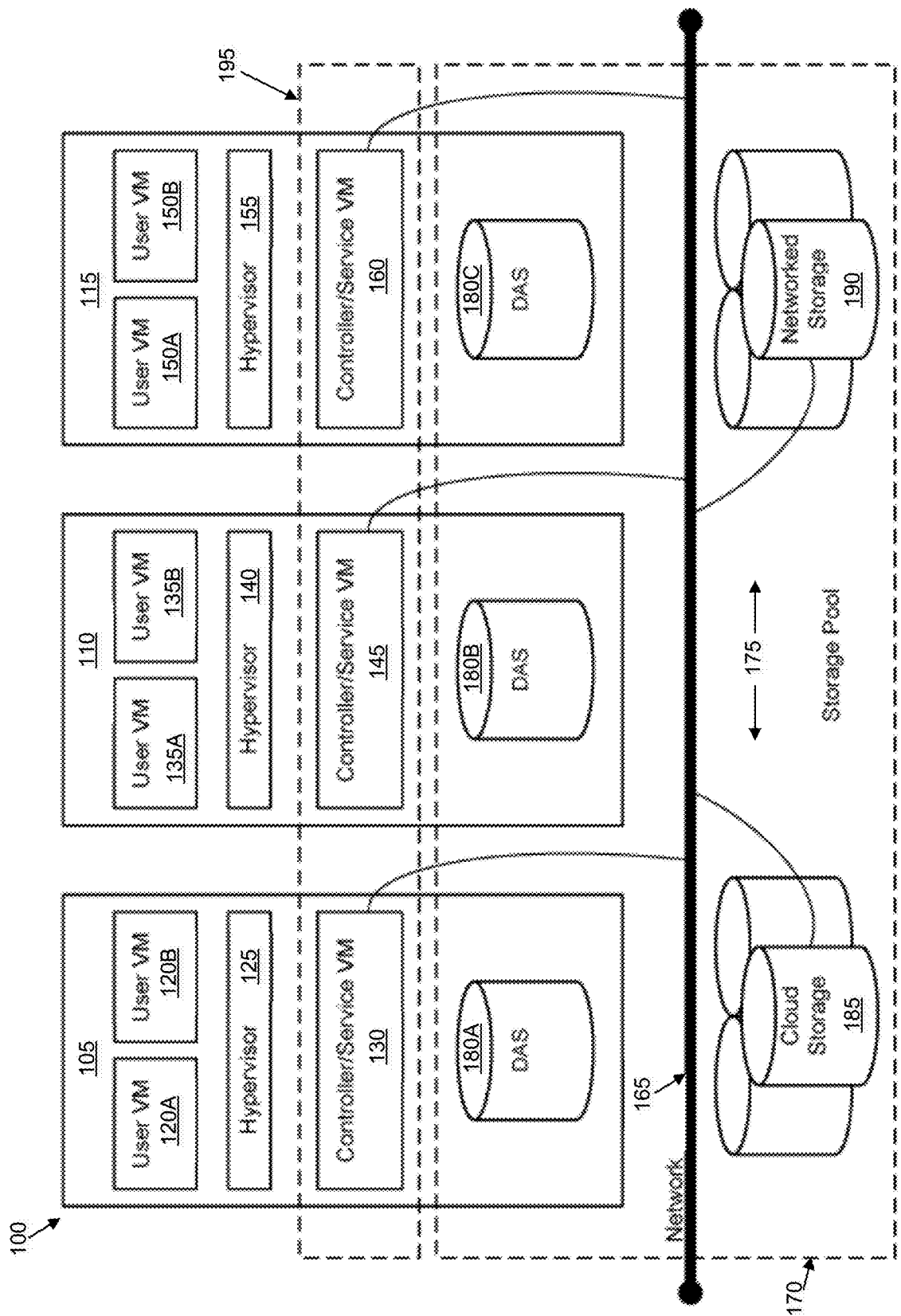
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a virtual computing system including a plurality of clusters, with each of the plurality of clusters including one or more host machines (also referred to herein as "nodes"). Each of the one or more host machines include one or more virtual machines running thereon, with each of the one or more virtual machines running one or more applications. In some embodiments, a virtual machine running on a source site such as client site may need to be migrated to a target site such as a disaster recovery site.

In some embodiments, a client may enter into a Service Level Agreement ("SLA") with a site operator of the disaster recovery site for using the disaster recovery site. The disaster recovery site is a highly engineered and reliable virtual computing system that provides data recovery and data backup facilities to the client site in accordance with the SLA and maintains a continuity of operation of the client site in the aftermath of a disaster condition. A disaster condition may include planned outages, performance related failures, component failures, power failures, natural calamities, or any other condition that hampers the normal operation of the clusters at the client sites. Generally speaking, and as used herein, a disaster condition is any condition that causes hardware failure or otherwise prevents a hardware component from operating as intended, or results in a downtime at the client site. For example, a condition that causes a malfunction of any cluster at a client site or that significantly hampers the normal operation of any clusters is referred to as a disaster condition. The disaster condition is also referred to herein as a failover event. When the downtime of the client site is preplanned, the disaster condition or failover event may be a planned failover event. When the disaster condition of failover event is not preplanned, the disaster condition or failover event may be an unplanned failover event.

When a disaster condition is detected, impacted clusters (e.g., entities of those clusters) from the client site are migrated to the disaster recovery sites for operation until the disaster condition is resolved. Migration of the entities from the client site to the disaster recovery site greatly reduces the downtime of the client site due to the disaster condition and maintains a substantial continuity of operation of the client site. Upon the resolution of the disaster condition, the entities may be migrated back to the client site and resume operation from the client site.

To migrate an entity from the client site to the disaster recovery site, the data of the entity on the client site is backed up, and the backed-up data is copied to the disaster recovery site. From the backed-up data on the disaster recovery site, the entity may be recreated on the disaster recovery site to become operational. Further, the instance of the entity on the client site may be powered off and all operations being performed on the entity may now be performed from the instance of that entity on the disaster recovery site. When multiple entities are being migrated, generally speaking, those entities are migrated in series. In some embodiments, a recovery plan may be in place that defines the order in which the entities are to be migrated. When those entities are migrated sequentially one after another, the total time to complete the migration of all the entities from the client site to the disaster recovery site may be significant and generally undesirable.

Thus, the present disclosure provides technical solutions by which the total time to migrate a plurality of entities from the client site to the disaster recovery site may be reduced. In some embodiments, while one or more entities are being migrated to the disaster recovery site, one or more additional entities may start replicating their data to the disaster recovery site without actually completing the migration. As indicated above, migration involves copying the data from the client site to the disaster recovery site, as well as creating an instance of the entity based on that copied data on the disaster recovery site and powering on that instance of the entity on the disaster recovery site. By replicating or copying the data of at least one entity in parallel with the migration of another entity, the overall time needed to migrate all of the entities may be reduced.

Referring now to FIG. 1, a virtual computing system 100 is shown, in accordance with some embodiments of the present disclosure. The virtual computing system 100 is a hyperconverged system having distributed storage, as discussed below. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100.

Each of the first node 105, the second node 110, and the third node 115 may also be configured to communicate and share resources with each other via the network 165 to form a distributed system. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170, the network-attached storage 175 and/or the direct-attached storage 180A-180C may include a variety of types of memory devices. For example, in some embodiments, one or more memories within the storage pool 170 may be provisioned from NAND flash memory cores, NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the storage pool. Generally speaking, the storage pool 170 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, magnetic strips or other types of magnetic storage drives, optical drives, cloud memory, compact disk (CD), digital versatile disk (DVD), smart cards, or any combination of primary and/or secondary memory that is suitable for performing the operations described herein.

The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended.

The user VMs 120, the user VMs 135, the user VMs 150, and any newly created instances of the user VMs are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
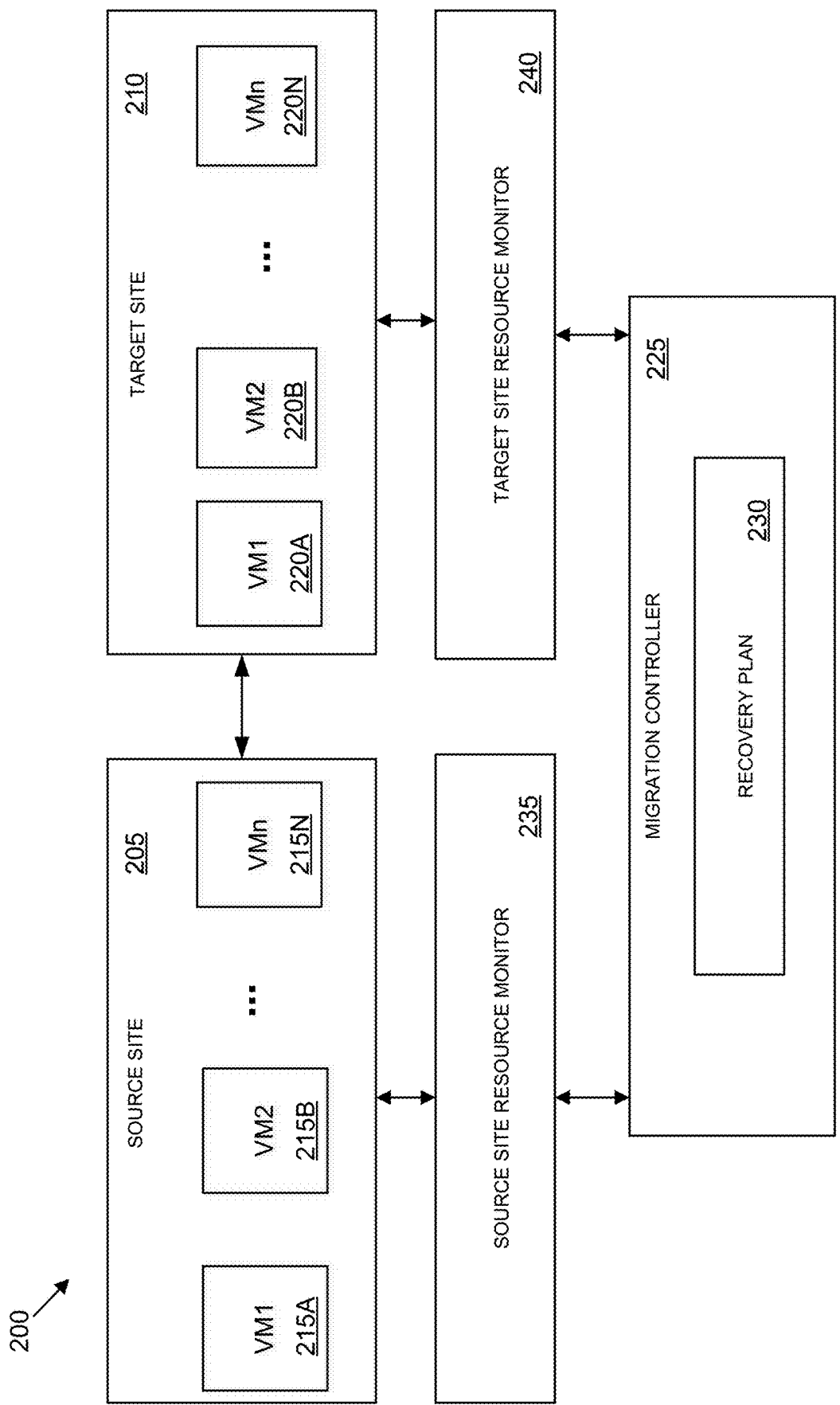
FIG. 2 is an example block diagram of a recovery system associated with the virtual computing system of FIG. 1, in accordance with some embodiments of the present disclosure.

Turning to FIG. 2, an example recovery system 200 is shown, in accordance with some embodiments of the present disclosure. The recovery system 200 may be used to create backup of data associated with entities located on a source site 205 and copy or replicate the backup data to a target site 210 to enable migration of one or more entities from the source site to the target site. In some embodiments, the recovery system 200 may also be used to migrate the one or more entities back from the target site 210 to the source site 205. In some embodiments, the source site 205 may be a client site or another site on which data is stored during regular operations or from which data is migrated to the target site 210. In some embodiments, the source site 205 may include one or more clusters, and each of the one or more clusters may be configured similar to the cluster of the virtual computing system 100 described above. For example, in some embodiments, the source site 205 may include one or more virtual machines such as virtual machines 215A-215N (collectively referred to herein as virtual machines 215). Each of the virtual machines 215 may be similar to the virtual machines 120, 135, 150 described above.

Further, in some embodiments, the virtual machines 215 may all be part of a single cluster, while in other embodiments, those virtual machines may be spread out across multiple clusters. Additionally, although only virtual machines are shown in the source site 205, in other embodiments, the source site may include other elements similar to the virtual computing system 100 described above. More-over, although the present disclosure is described with respect to migrating a virtual machine, the present disclosure is intended to be applicable to other types of entities that are to be migrated between the source site 205 and the target site 210. An "entity" may include virtual machines, virtual disks, software applications, containers, and other hardware, software, storage, virtual clouds, and data center components that make up the virtual computing system 100.

The target site 210 provides a recovery platform for the virtual machines 215 of the source site 205. Specifically, the target site 210 provides resources to migrate the clusters (e.g., specific entities such as the virtual machines 215 of the clusters) and associated data from the source site 205 to the target site during actual or impending disruption of operation of the source site. Thus, the target site 210 provides a mechanism to maintain a continuity of operation and protection of the entities of the source site 205 during actual or impending disruption of operation of the source site, and thus, keep the source site running without significant interruption until normal operations are resumed. Thus, in some embodiments, the target site 210 may be considered a disaster recovery site that is a highly engineered, highly reliable platform for providing reliability of operation to the source site 205. Although the target site 210 is shown as being associated with a single source site (e.g., the source site 205), in other embodiments, the target site may be associated with multiple source sites. Further, the target site 210 may be located in the same location or a location remote from the source site 205.

In some embodiments, the target site 210 may include one or more clusters, and each of the clusters may include one or more virtual machines such as virtual machines 220A-220N (collectively referred to herein as virtual machines 220). In some embodiments, each of the clusters of the target site 210 may be structured similar to the virtual computing system 100 of FIG. 1. Further, the virtual machines 220 may all be part of a single cluster or spread across multiple clusters. In some embodiments, the virtual machines 220 may be similar to the virtual machines 120, 135, 150. Additionally, although only the virtual machines 220 are shown in the target site 210, in other embodiments, the target site may include other entities to which data from the source site 205 may be migrated to.

In some embodiments, the data that has been backed up on the source site 205 is replicated to the target site 210 during, or in anticipation of, a failover event. A "failover event" may be any event that causes or may potentially cause a disruption of operation at the source site 205. In some embodiments, the failover event may be a planned failover event such as a scheduled maintenance, planned power outage, or other type of planned downtime of the source site 205. In other embodiments, the failover event may be an unplanned failover event such as a disaster event (e.g., fire, unplanned power outage, earthquake, etc.) or any other type of unplanned downtime of the source site 205.

Further, data may be backed up at the source site 205 in accordance with a Service Level Agreement ("SLA"). The SLA defines a level of service or commitment between a client (e.g., whose data is hosted on the source site 205) and a service provider (e.g., the entity providing and/or managing the target site 210). The SLA may define a variety of performance related requirements/parameters. For example, the SLA may define a Recovery Time Objective ("RTO"). RTO is measured forward in time from the moment a particular entity (e.g., the virtual machines 215) becomes inoperative (e.g., on the source site 205) to the time that entity is back up and running (e.g., on the target site 210).

Lower RTOs are desirable. RTO's may be measured in seconds, minutes, hours, or other units of time. For example, if virtual machines, VM1 and VM2, are being migrated from the source site 205 to the target site 210, the RTO may include the time from which the first one of the VM1 and VM2 goes down on the source site to the time at which both of the VM1 and VM2 are back up and operating on the target site.

The SLA may also define a Recovery Point Objective ("RPO"). RPO is indicative of an entity's recovery time point. In other words, RPO determines how often data of the entity needs to be backed up that may otherwise be lost due to a failover event. RPO is also measured in units of time. Again, smaller RPOs are desired. For example, smaller the RPO, smaller is the amount of data lost, and therefore, data needs to be backed up less frequently.

The SLA may also define, or be associated with, a recovery plan. The recovery plan, which may be considered a user-defined policy, may define which entities of the source site 205 are to be migrated to the target site 210 during a failover event. In some embodiments, the recovery plan may indicate that all entities of a particular type (e.g., all of the virtual machines 215) are to be migrated from the source site 205 to the target site 210 during a failover event. In other events, the recovery plan may indicate that a subset of entities are to be migrated from the source site 205 to the target site 210 during a failover event. The recovery plan may also define an order in which those entities are to be migrated. For example, the recovery plan may define that the virtual machines, VM1, VM2, VM3, and VM4, are to be migrated from the source site 205 to the target site 210 during a failover event. The recovery plan may also define that the VM1 is to be migrated before migrating VM2. Once VM2 migrates, VM3 is to migrate, and so on. By defining which particular entities to migrate and the order in which to migrate, more important entities (e.g., entities storing more critical data) may be protected first.

In some embodiments, the recovery plan may additionally define other parameters. For example, in some embodiments, the recovery plan may define a particular manner in which entities are to be backed up, the failover events during which the entities are to be migrated to the target site 210, and any other parameter that may be considered suitable. In some embodiments, the recovery plan may also divide the group of entities being migrated to the target site 210 into one or more stages, as discussed in greater detail below. For example, in some embodiments, the recovery plan may designate each virtual machine to be part of either an initial stage or a later stage.

Further, as discussed below, each entity may be migrated based on either a synchronous mode of replication or an asynchronous mode of replication. "Replication" may include copying or taking a backup of data of an entity on the source site 205 and copying or moving the backup data to the target site 210 to enable the migration of the entity from the source site to the target site. "Migration" of an entity may include powering off the entity on the source site 205 and recreating the entity on the target site 210 based on the data replicated from the source site 205 and resuming operation of the entity on the target site. Once the entity resumes operation on the target site 210, the migration of that entity may be said to be complete.

When migrating an entity (e.g., the virtual machines 215) based on a synchronous mode of replication, the data of that entity may be copied from the source site 205 to the target site 210 such that any changes to the data on the source site are carried over instantaneously (or substantially instantaneously) over to the target site. Thus, in a synchronous mode of replication, the replication is considered complete only when both the source site 205 and the target site 210 have acknowledged the completion of an update (e.g., write) at the source site. Advantageously, with a synchronous mode of replication, since every piece of data (e.g., user data, metadata, and any other type of data) associated with the entity being migrated is replicated instantaneously (or substantially instantaneously) to the target site 210, the RPO is zero (or close to zero). In other words, with a synchronous mode of replication, no data is lost in case the source site 205 goes down during migration of an entity. Further, with synchronous mode of replication, RTO may be less relative to asynchronous mode of replication since any changes to the data are copied instantaneously (or substantially instantaneously) to the target site 210 and any additional time taken to replicate the changes is not required.

However, a synchronous mode of replication may be burdensome on system resources. For example, since every change in data associated with the entity is replicated instantaneously (or substantially instantaneously), an input/output latency is incurred due to needing to write the data to both the source site 205 and the target site 210, thereby requiring strict latency guarantees throughout the migration lifecycle. Synchronous mode of replication may also consume greater network bandwidth, require greater consumption of computational resources (e.g., CPU utilization, memory utilization, etc.), and may occur at slower speeds.

When migrating an entity based on an asynchronous mode of replication, any changes to the data of the entity on the source site 205 may be replicated to the target site 210 at designated periods of time (e.g., every hour, every day, etc.) instead of the instantaneous (or substantially instantaneous) replication of the synchronous mode of replication. In some embodiments, the changes may be made in background in an asynchronous mode of replication. In some embodiments, the entity being migrated from the source site 205 may be powered off before migration and powered back on at the target site 210. Due to replicating data in background, the strict latency requirements of synchronous mode of replication are not required with asynchronous mode of replication. Further, any changes to the data of the entity have to be copied to the target site 210 before the migration of the entity is complete. Thus, an asynchronous mode of replication may have a higher RTO compared to a synchronous mode of replication. Further, the RPO may be non-zero in an asynchronous mode of replication depending upon the SLA. However, an asynchronous mode of replication consumes fewer resources (e.g., less CPU utilization, less memory consumption, etc.), is easier on network bandwidth, has smaller input/output latency, and may occur at faster speeds.

Although synchronous mode of replication may be able to provide lower RTO and RPO than asynchronous mode of replication, the synchronous mode of replication may not always be possible or practical due to extra burden on system resources. The present disclosure provides a mechanism to dynamically switch between synchronous and asynchronous modes of replication based upon satisfaction of certain operating conditions, particularly in planned failover events. Specifically, as discussed above, in planned failover events, the RPO is zero (or close to zero) and the RTO, albeit less than the RTO in asynchronous mode replication, is still non-zero. The present disclosure provides a mechanism to dynamically adjust the RTO by dynamically switching between synchronous and asynchronous modes of replication.

In some embodiments, during migration of an entity (e.g., the virtual machines 215) from the source site 205 to the target site 210 during a planned failover event, a migration controller 225 may dynamically decide whether to migrate the entity in a synchronous mode or asynchronous mode of replication in accordance with a recovery plan 230. Although the migration controller 225 is shown separate from the source site 205 and the target site 210, in some embodiments, the migration controller may be part of either the source site, the target site, or a combination of both. Further, in some embodiments, the migration controller 225 may be part of a hypervisor or controller/service virtual machine of a node (e.g., the leader node). In other embodiments, the migration controller 225 may be separate from the source site 205 and the target site 210, and associated with those sites in operational association. Further, the migration controller 225 may be a configured as a logical block or circuitry that receives instructions and performs operations in accordance with those instructions. In some embodiments, the migration controller 225 may be configured as a software, firmware, hardware, or a combination thereof.

Further, although not shown, the migration controller 225 may include one or more Central Processing Unit ("CPU") cores or processors that may be configured to execute instructions for executing the recovery plan 230 and migrating an entity from the source site 205 to the target site 210. The instructions may be stored within a memory device associated with the migration controller 225. To execute the recovery plan 230, the migration controller 225 may read the instructions associated with the recovery plan that are stored within the memory device. The memory device may be any of a variety of memory types, including a variety of volatile memories, non-volatile memories, or a combination thereof. For example, in some embodiments, the memory device or portions thereof may include NAND flash memory cores. In other embodiments, one or more of the memory circuits 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use with the migration controller 225. In some embodiments, the memory device or portions thereof may be configured as other types of storage class memory ("SCM"). Generally speaking, the memory device may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

Additionally, although not shown, in some embodiments, the migration controller 225 may be associated with a user interface through which the recovery plan 230 and any other user input may be input into the migration controller. Thus, the user interface may facilitate human-computer interaction between the users and the migration controller 225. In some embodiments, the user interface may present a graphical user interface ("GUI") to a user to receive input from and provide output to the user. The GUI may present a variety of graphical icons, windows, visual indicators, menus, visual widgets, and other indicia to facilitate user interaction. In other embodiments, the user interface may be configured in any suitable way.

Further, the user interface may be configured to receive user inputs in a variety of ways. In some embodiments, the user interface may be configured to receive user inputs via one or more input devices. For example, in some embodiments, a user may use a variety of input technologies such as a keyboard, stylus, touch screen, mouse, track ball, keypad, microphone, voice recognition, motion recognition, remote controllers, input ports, one or more buttons, dials, joysticks, camera, and any other input peripheral that is associated with the migration controller 225 and that allows an external source, such as a user, to enter information (e.g., data) into the migration controller and send instructions to the migration controller. In other embodiments, the user interface may be configured to receive the user inputs in other ways.

The user interface may also be configured to present outputs/information to the users in a variety of ways. In some embodiments, the user interface may present outputs to the user via the output devices such as external memories, printers, speakers, displays, microphones, light emitting diodes, headphones, plotters, speech generating devices, video devices, global positioning systems, and any other output peripherals that are configured to receive information (e.g., data) from the migration controller 225. The "data" that is either input into the migration controller 225 and/or output from the migration controller may include any of a variety of textual data, graphical data, video data, image data, sound data, position data, sensor data, combinations thereof, or other types of analog and/or digital data that is suitable for processing using the migration controller. In other embodiments, the user interface may be configured to present the outputs in other ways (e.g., audible, tactile, or visual alarms, etc.). Generally speaking, the migration controller 225 may be associated with any type of hardware, software, and/or firmware component that enables the migration controller to perform the functions described herein.

Additionally, in some embodiments, a user may access the user interface and the migration controller 225 via an Application Programming Interface ("API"). For example, to access the migration controller 225 via the user interface using the API, a user may use designated devices such as laptops, desktops, tablets, mobile devices, other handheld or portable devices, and/or other types of computing devices that are configured to access the API. In some embodiments, these devices may be different from the computing device on which the migration controller 225 is installed. In other embodiments, the migration controller 225 may be hosted on a cloud service and may be accessed through the cloud via a web or mobile application.

In some embodiments, the user may access the user interface/the migration controller 225 via a web browser, upon entering a uniform resource locator ("URL") for the API such as an IP address or other designated web address. In some embodiments, the user interface/the migration controller 225 may be accessed via a mobile application downloaded to a mobile device. In other embodiments, the user interface/the migration controller 225 may be configured for access in other ways. Further, in some embodiments, the API that may be used to communicate with the migration controller 225 via the user interface may be a representational state transfer ("REST") type of API. In other embodiments, the API may be any other type of web or other type of API (e.g., ASP.NET) built using any of a variety of technologies, such as Java, .Net, etc., that is suitable for facilitating communication between the migration controller 225 and the users via the user interface. In some embodiments, the API may be configured to facilitate communication via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication using other or additional types of communication protocols. Further, in some embodiments, the migration controller 225 may communicate with users in ways other than an API.

Referring still to FIG. 2, the migration controller 225 may be configured to dynamically switch between synchronous and asynchronous modes of replication during migration of an entity from the source site 205 to the target site 210. In some embodiments, the migration controller 225 may dynamically switch between the synchronous and asynchronous modes of replication based upon information received from a source site resource monitor 235 and/or a target site resource monitor 240.

The source site resource monitor 235 may be configured as a logic block or circuit in hardware, software, firmware, or a combination thereof to monitor and gather resource consumption data from the source site 205. For example, the source site resource monitor 235 may be configured to gather data related to CPU utilization, memory utilization, input/output latency, network bandwidth, and any other resource consumption statistic. In some embodiments, the source site resource monitor 235 may gather the above mentioned resource consumption data before, during, and/or after migration of an entity from the source site 205 to the target site 210. In some embodiments, the source site resource monitor 235 may be configured to gather the resource consumption data from the entity that is being migrated, from a combination of elements of the source site 205, and/or the entire source site in general. Although the source site resource monitor 235 is shown separate from the source site 205, in some embodiments, the source site resource monitor may be part of the source site. For example, in some embodiments, the source site resource monitor 235 may be part of the leader node of the source site 205 or of another node of the source site that has been designated to monitor and gather resource consumption data.

Similarly, the target site resource monitor 240 may be configured to monitor and gather resource consumption data from the target site 210. For example, the target site resource monitor 240 may be configured to gather data related to CPU utilization, memory utilization, input/output latency, network bandwidth, and any other resource consumption statistic. In some embodiments, the target site resource monitor 240 may gather the above mentioned resource consumption data before, during, and/or after migration of an entity from the source site 205 to the target site 210. In some embodiments, the target site resource monitor 240 may be configured to gather the resource consumption data from the entity that is migrated, from a combination of elements of the target site 210, and/or the entire target site in general. Although the target site resource monitor 240 is shown separate from the target site 210, in some embodiments, the target site resource monitor may be part of the target site. For example, in some embodiments, the target site resource monitor 240 may be part of the leader node of the target site 210 or of another node of the target site that has been designated to monitor and gather resource consumption data.

Further, although the source site resource monitor 235 and the target site resource monitor 240 are shown as separate components, in some embodiments, single component may be configured to monitor and gather resource consumption data from both the source site 205 and the target site 210. In some embodiments, either or both of the source site resource monitor 235 and the target site resource monitor 240 may be part of the migration controller 225.

It is to be understood that only some components of the recovery system 200 are shown and described in FIG. 2. In other embodiments, the recovery system 200 may include other or additional components that may be needed or considered desirable to have in performing the functions described herein.

Figure 3:
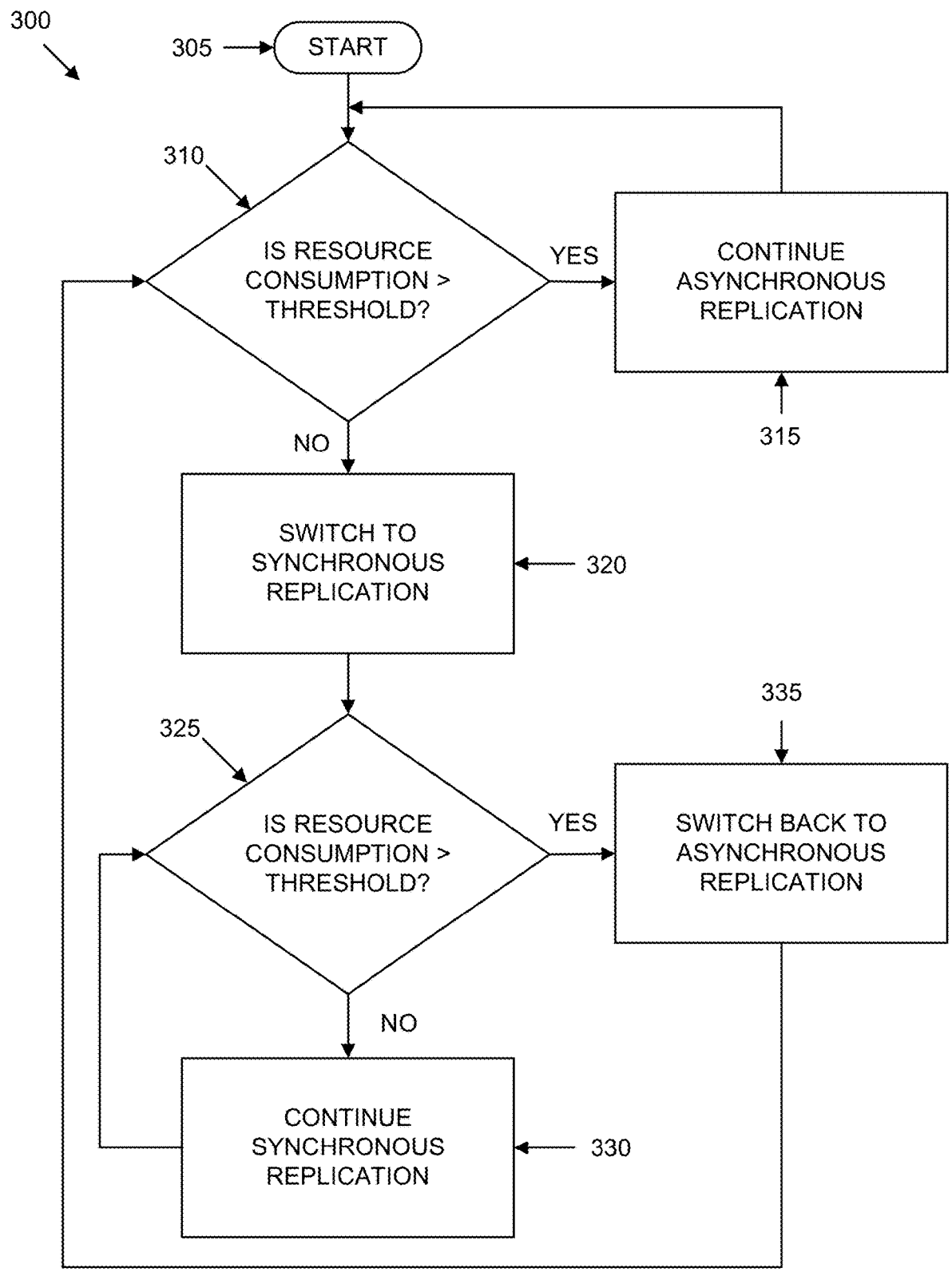
FIG. 3 is an example flowchart outlining operations for dynamically switching between a synchronous mode of replication and an asynchronous mode of replication of data of an entity during a recovery using the recovery system of FIG. 2, in accordance with some embodiments of the present disclosure.

Referring now to FIG. 3, an example flowchart outlining a process 300 is shown, in accordance with some embodiments of the present disclosure. The process 300 may be performed by the migration controller 225. Thus, the process 300 is discussed in conjunction with FIG. 2. The process 300 may include other or additional operations depending upon the particular embodiment. The process 300 may be used by the migration controller 225 to dynamically convert replication of data of an entity (e.g., the virtual machines 215) between the synchronous and asynchronous modes of replication during migration of the entity during a planned failover event. In some embodiments, the process 300 may also be used during an unplanned failover event. Further, the process 300 is explained with respect to migration of an entity (e.g., the virtual machines 215) from the source site 205 to the target site 210. However, in other embodiments, the process 300 may similarly be used for migrating an entity (e.g., the virtual machines 215) from the target site 210 to the source site 205.

The process 300 starts at operation 305 with the migration controller 225 receiving an indication that an entity (e.g., the virtual machines 215) is to be migrated from the source site 205 to the target site 210 during a planned failover event. Upon receiving the indication, the migration controller 225 may review the recovery plan to determine if there are specific instructions defined in the recovery plan for the migration. For example, in some embodiments, the recovery plan may identify parameters pursuant to which the migration controller 225 dynamically converts the replication of data between the synchronous and asynchronous modes of replication. In other embodiments, such parameters may be defined separately from the recovery plan. In other embodiments, the migration controller 225 may be intelligent enough to self-identify parameters based on which to dynamically convert between the synchronous and asynchronous modes of replication.

One such parameter is resource consumption. For example, in some embodiments, the migration controller 225 may be configured to monitor consumption of resources within the source site 205 and/or the target site 210 at operation 310. Specifically, in some embodiments, the migration controller 225 may receive resource consumption data from the source site resource monitor 235 and/or the target site resource monitor 240. Based on the received resource consumption data, the migration controller 225 may determine if the replication of data is to be converted between the synchronous and asynchronous modes of replication. In some embodiments, the migration controller 225 may make the determination of converting between the synchronous and asynchronous modes of replication based on resource consumption at the source site 205 only. In other embodiments, the migration controller 225 make the determination of converting between the synchronous and asynchronous modes of replication based on resource consumption at the target site 210 only. In yet other embodiments, the migration controller 225 may make the determination based on a combination of resource consumptions at both the source site 205 and the target site 210. In some embodiments, the migration controller 225 may use a weighted combination of the resource consumptions at the source site 205 and the target site 210. In other embodiments, the migration controller 225 may determine an overall resource consumption in the recovery system 200 due to the migration of the entity (e.g., by averaging the resource consumption across the source site 205 and the target site 210, etc.). In some embodiments, the migration controller 225 may make the determination based on additional or other types of resource consumption such as network bandwidth or other resources that may fall outside of the source site 205 and the target site 210, but may impact the migration of an entity from the source site to the target site and/or from the target site back to the source site.

When combining the resource consumption data from both the source site 205 and the target site 210, in some embodiments, the migration controller 225 may be configured to look at the same resource or resources at both the source site and the target site. For example, in some embodiments, the migration controller 225 may be configured to make the determination of converting between the synchronous and asynchronous modes of replication based upon input/output latency at both the source site 205 and the target site 210. In other embodiments, the migration controller 225 may be configured to make the determination based upon consumption of a first set of one or more resources at the source site 205 and consumption of a second set of one or more resources at the target site 210, such that at least one resource at the source site is different from the second set of the one or more resources at the target site. For example, in some embodiments, the migration controller 225 may review resource consumption data of input/output latency at the source site 205 plus memory utilization data at the target site 210. Further, in some embodiments, the migration controller 225 may make the determination based upon the consumption of a single resource. In other embodiments, the migration controller 225 may make the determination based on consumption of multiple resources.

Thus, at the operation 310, the migration controller 225 determines if the consumption of the resource(s) (e.g., CPU utilization, memory, latency, network bandwidth, etc.) being considered is(are) greater than a predetermined threshold. In some embodiments, a separate threshold may be defined for each type of resource consumption that is considered. For example, in some embodiments, the migration controller 225 may be configured with a first threshold for a first resource consumption such as input/output latency, with a second threshold for a second resource consumption such as network bandwidth, and so on. Each of the predetermined thresholds may be indicative of a burden on the recovery system 200 or otherwise be indicative of a reduced performance. For ease of explanation, the rest of the process 300 is explained with respect to the resource consumption of input/output latency. However, it is to be understood that in other embodiments, other and/or additional resource(s) may be used to make the determination of the operation 310.

For example, at the operation 310, the migration controller 225 may determine whether the overall input/output latency of replicating data of an entity from the source site 205 to the target site 210 is greater than a first predetermined threshold. Upon determining that the input/output latency is greater than the first predetermined threshold, the process 300 proceeds to operation 315 where asynchronous replication is continued for the entity being migrated.

In some embodiments, when the migration of the entity begins, the migration controller 225 may be configured to start the migration in an asynchronous mode of replication. To start the asynchronous mode of replication, in some embodiments, the migration controller 225 may take a backup of the data of the entity being migrated upon receiving an indication that the entity is to be migrated. For example, in some embodiments, the migration controller 225 may create a snapshot of the entity being migrated. Upon taking the snapshot or creating the backup of the data in another way, the migration controller 225 may turn off the entity, in some embodiments, at the source site 205. By turning off the entity at the source site 205, the entity may be prevented from making any further changes until the migration is complete. This (e.g., turning off the entity) may be undesirable. So, in some embodiments, the entity may continue to operate on the source site 205 after the migration controller 225 has captured the last snapshot or created the backup data. The migration controller 225 may copy the snapshot or backup data to the target site 210. However, any changes to the entity after the capture of the snapshot or the backup data are not copied right away to the target site 210 in the asynchronous mode of replication, as discussed above.

Upon determining that the input/output latency is greater than the first predetermined threshold at the operation 310, the migration controller 225 continues to replicate the data of the entity being migrated using the asynchronous mode of replication at the operation 315, and keeps monitoring the input/output latency relative to the first predetermined threshold. In some embodiments, the migration controller 225 may be configured to start the migration in a synchronous mode of replication. In such cases, upon determining that the input/output latency is greater than the first predetermined threshold at the operation 310, the migration controller 225 may switch the replication of data from the synchronous to the asynchronous mode.

On the other hand, if at the operation 310, the migration controller 225 determines that the input/output latency is less than or equal to the first predetermined threshold, the process 300 proceeds to operation 320. Specifically, if the input/output latency is less than or equal to the first predetermined threshold, that may indicate that the recovery system 200 is able to handle the migration of the entity being migrated, and that there are still available system resources that may be used for the migration. Thus, in such cases, at the operation 320, the migration controller 225 switches the replication of data from the asynchronous mode to the synchronous mode. In those embodiments in which the migration controller 225 started the migration in the synchronous mode, upon determining that the input/output latency is less than or equal to the first predetermined threshold, the migration controller may continue to replicate the data in the synchronous mode.

To switch the replication of the data to synchronous mode, the migration controller 225 may capture all of the updates to the entity since the previous snapshot or backup data was created (e.g., by creating a new snapshot or backup data), and copy those updates to the target site 210. The migration controller 225 may then continue to monitor the entity for changes on the source site 205 and copy the changes instantaneously (or substantially instantaneously) to the target site 210, as discussed above. However, since the synchronous mode of replication increases the input/output latency (e.g., operations become slower), the migration controller 225 continues to monitor the input/output latency at operation 325.

Thus, at the operation 325, the migration controller 225 determines whether the input/output latency has become greater than a second predetermined threshold. The second predetermined threshold may be same as or different from the first predetermined threshold of the operation 310. If the migration controller 225 determines that the input/output latency continues to be less than or equal to the second predetermined threshold at the operation 325, the migration controller continues the replication in the synchronous mode at operation 330. If, at the operation 325, the migration controller 225 determines that the input/output latency has become greater than the second predetermined threshold, the migration controller may determine that the synchronous mode of replication is impacting performance negatively and switches back to the asynchronous mode of replication at operation 335.

In some embodiments, and particularly in those embodiments in which the migration controller 225 is considering multiple resources, the migration controller 225 may be configured to assign priority to resources. For example, if the migration controller 225 is considering input/output latency and network bandwidth, the migration controller 225 may be configured to prioritize network bandwidth over input/output latency. Thus, in such cases, if the migration controller 225 determines that the network bandwidth has exceeded its threshold but that the input/output latency is still within its threshold, since network bandwidth is prioritized over input/output latency, the migration controller may either continue to replicate in an asynchronous mode or switch to asynchronous mode. In other embodiments, the migration controller 225 may be configured to switch to asynchronous mode or continue asynchronous mode of replication only upon both the network bandwidth and the input/output latency exceeding their respective thresholds.

Thus, the migration controller 225 may be configured to analyze resource consumption in a variety of ways. By monitoring resource consumption and dynamically switching between synchronous and asynchronous modes of replication, the migration controller 225 reduces the RTO of migrating an entity from the source site 205 to the target site 210 relative to the RTO of migrating the entity in an asynchronous only mode. Further, by dynamically switching between synchronous and asynchronous modes of replication, the migration controller 225 balances the consumption of resources within the recovery system 200 such that other entities or operations within the recovery system are not negatively impacted. Upon migrating all of the data of the entity from the source site 205 to the target site 210 using a combination of synchronous and asynchronous modes of replication, the entity may be powered on at the target site and resume normal operation to complete the migration. Therefore, in some embodiments, each entity being migrated may be migrated based on a combination of a synchronous mode of replication and an asynchronous mode of replication.

Figure 4:
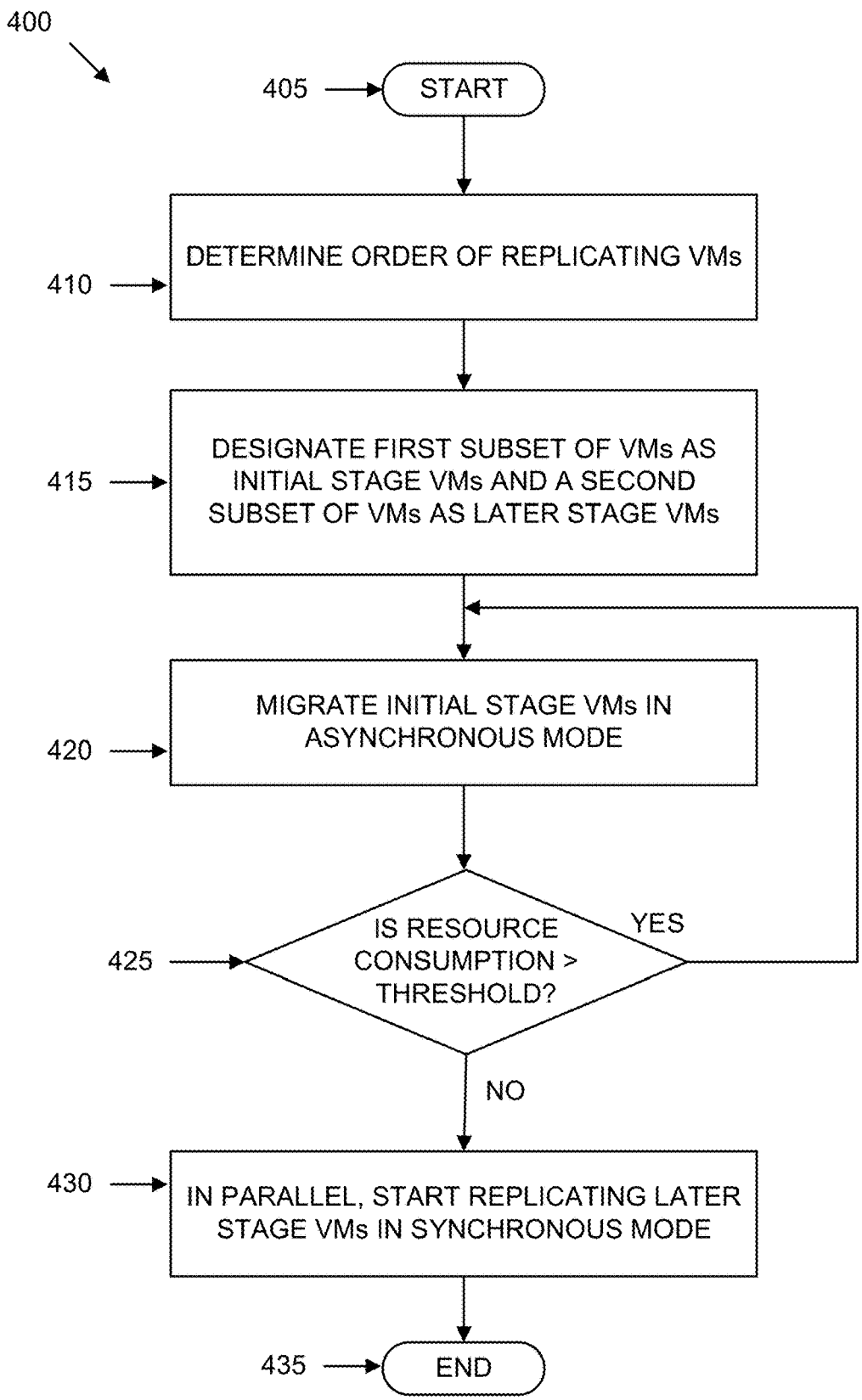
FIG. 4 is another example flowchart outlining operations for dynamically switching between a synchronous mode of replication and an asynchronous mode of replication of data of a plurality of entities during a recovery using the recovery system of FIG. 2, in accordance with some embodiments of the present disclosure.

Turning now to FIG. 4, another example flowchart outlining operations of a process 400 is shown, in accordance with some embodiments of the present disclosure. The process 400 may be performed by the migration controller 225. Thus, the process 400 is discussed in conjunction with FIG. 2. The process 400 may include other or additional operations depending upon the particular embodiment. The process 400 may be used by the migration controller 225 to dynamically convert replication of data of a plurality of entities (e.g., the virtual machines 215) between the synchronous and asynchronous modes of replication during migration of the entity during a planned failover event in accordance with the recovery plan 230. In some embodiments, the process 400 may also be used during an unplanned failover event. Further, the process 400 is explained with respect to migration of entities (e.g., the virtual machines 215) from the source site 205 to the target site 210. However, in other embodiments, the process 400 may similarly be used for migrating entities (e.g., the virtual machines 215) from the target site 210 to the source site 205.

The process 400 starts at operation 405 with the migration controller 205 receiving an indication to migrate a plurality of entities (e.g., the virtual machines 215) from the source site 205 to the target site 210. Upon receiving the indication, at operation 410, the migration controller 225 determines an order in which the plurality of entities are to be migrated. As discussed above, in some embodiments, the recovery plan 230 may identify the order in which a client wants the plurality of entities to be migrated. For ease of explanation, the process 400 is discussed with respect to migrating ten virtual machines, VM1-VM10. It is to be understood that in other embodiments the number of virtual machines being migrated may be greater than or less than ten. Further, although virtual machines are being migrated, in other embodiments, other or additional types of entities may be migrated using the process 400.

To migrate the ten virtual machines, VM1-VM10, the migration controller 225 may review the recovery plan 230 to identify an order in which those virtual machines are to be migrated. In some embodiments, the migration controller 225 may be configured with a default order to migrate entities in case the recovery plan 230 does not identify an order for migration. For example, in some embodiments, the default order of migration programmed within the migration controller 225 may be based upon the size of an entity, usage patterns of an entity, etc. Thus, for example, at the operation 410, the migration controller 225 may determine, whether from the recovery plan 230 or from the default order of migration, that VM1 is to be migrated before VM2, which in turn is to be migrated before VM3, which is to be migrated before VM4, and so on. In some embodiments, to migrate VM1 before VM2, VM2 before VM3, VM3 before V4, and so on may mean that $VM_i$ is to become operational on the target site 210 before $VM_{i+1}$ becomes operational on the target site.

Upon determining the order of migration, the migration controller 225 divides the virtual machines being migrated into an initial stage and a later stage at operation 415. In some embodiments, the recovery plan 230 may define parameters of the initial stage and the later stage. For example, in some embodiments, the recovery plan 230 may define the number of virtual machines that are to fall within the initial stage and the number of virtual machines that are to fall within the later stage. For example, in some embodiments, the recovery plan 230 may define that a first number of the virtual machines to be migrated first belong to the initial stage and that the remaining virtual machines belong to the later stage. In some embodiments, the migration controller 225 may have default parameters set therein to divide the virtual machines into the initial stage and the later stage. In some embodiments, the migration controller 225 may be configured to use the default parameters if the recovery plan 230 does not define how to group the virtual machines into the initial stage and the final stage. Thus, at the operation 415, the migration controller 225 designates a first subset of the virtual machines into an initial stage and designates a second subset of virtual machines into a later stage. For example, in some embodiments, the migration controller 225 may designate that VM1-VM5 belong to the initial stage and VM6-VM10 belong to the later stage. In other embodiments, the migration controller 225 may divide the virtual machines, VM1-VM10, into the initial stage and the later stage in other ways. In some embodiments, the number of virtual machines in the initial stage need not be same as the number of virtual machines in the later stage. In some embodiments, the initial stage may have fewer virtual machines than the later stage. In yet other embodiments, the initial stage may have more virtual machines than the later stage.

Further, in some embodiments, the designation of the virtual machines into the initial stage and the later stage may dynamically vary as virtual machines are migrated to the target site 210. For example and continuing with the example above in which VM1-VM5 are designated as the initial stage and VM6-VM10 are designated as the later stage, when the migration of VM1 is complete, VM6 may be moved from the later stage to the initial stage such that the initial stage virtual machines include VM2-VM6 and the later stage virtual machines include VM7-VM10. In some embodiments, when there are no more virtual machines left in the later stage and all remaining virtual machines to be migrated belong to the initial stage, the initial stage virtual machines may be further divided to group those virtual machines into initial stage and later stage. For example, when the virtual machines VM1-VM5 have been migrated and the remaining virtual machines VM6-VM10 are all in the initial stage, in some embodiments, the migration controller 225 may be configured to divide VM6-VM10 further into initial and later stages based upon definitions in the recovery plan 230 or based on default parameters programmed within the migration controller. For example, the migration controller 225 may designate that VM6 and VM7 belong to the initial stage and VM8-VM10 belong to the later stage. In other embodiments, when the virtual machines VM1-VM5 have been migrated and the remaining virtual machines VM6-VM10 are all in the initial stage, no further division into initial stage and later stage may be performed.

In other embodiments, the designation of the virtual machines into the initial stage and the later stage may be static. For example, in such embodiments, when the migration of the VM1 is complete, the initial stage virtual machines may now include VM2-VM5 and the later stage virtual machines may continue to include VM6-VM10. Additionally, in some embodiments, when all the initial stage virtual machines have been migrated, the later stage virtual machines may be further divided and designated into initial or later stages. For example, when only the VM6-VM10 are left for migration, the migration controller 225 may further divide those virtual machines, based on the recovery plan 230 or default parameters programmed therein, into an initial stage and a later stage. In other embodiments, the VM6-VM10 may all just be designated as initial stage.

Thus, the division of the virtual machines into the initial stage and the later stage may be dynamic or static and may be performed in any of a variety of ways. At operation 420, the migration controller 225 starts migrating the virtual machines in the initial stage using an asynchronous mode of replication. In some embodiments, the migration controller 225 starts migrating the virtual machines in the initial stage according to the order determined at the operation 410. Thus, for example, since the order of the operation 410 indicated that VM1 is to be migrated first, the migration controller 225 may start migrating VM1 of the virtual machines VM1-VM5 of the initial stage in an asynchronous mode of replication. When the VM1 is migrated (e.g., operational on the target site 210), the migration controller 225 may start migrating the next virtual machine in the order, VM2, in an asynchronous mode of replication. When the VM2 has been migrated, VM3 can start migrating, and so on.

At operation 425, the migration controller 225 may determine whether the resource consumption is greater than a predetermined threshold. The operation 425 is similar to the operations 310 and 325, and therefore not described again. If the migration controller 225 determines that the resource consumption is greater than the predetermined threshold, the migration controller continues to migrate virtual machines in the asynchronous mode of replication at the operation 420. On the other hand, if the migration controller 225 determines at the operation 425 that the resource consumption is less than or equal to the predetermined threshold, the process 400 proceeds to operation 430. At the operation 430, the migration controller 225 starts replicating data of one or more virtual machines in the later stage synchronously in parallel with the migration of the virtual machines in the initial stage being migrated in the asynchronous mode of replication.

For example, at the operation 430, in some embodiments, the migration controller 225 may start synchronously replicating the data of the VM6, which is the highest priority (e.g., based on the order) virtual machine in the later stage. The synchronous replication of the data of the VM6 may occur in parallel with the migration of the virtual machines based on the asynchronous replication in the initial stage. In some embodiments, when the synchronous replication of VM6 is complete or along with the synchronous replication of VM6, the migration controller 225 may start synchronously replicating the data of one or more additional virtual machines in the later stage, such as VM7, VM8, etc., depending upon the resource consumption. Thus, the migration controller 225 may continue to monitor resource consumption and continue synchronous replication of data of virtual machines in the later stage along with the asynchronous replication of virtual machines in the initial stage.

It is to be understood that even though the data of the virtual machines in the later stage is replicated, those virtual machines are not considered migrated to the target site 210 until those virtual machines are turned on and become operational on the target site. By replicating the data of those virtual machines in advance, when it is the turn of those virtual machines to be migrated in accordance with the order, the data of those virtual machines is already on the target site 210 and does not need to be copied. Those virtual machines may simply be turned on at the target site 210 to become operational and complete migration. Thus, by overlapping the migration of the virtual machines in the initial stage with the replication of data to the target site 210 of the virtual machines in the later stage, the present disclosure provides a mechanism to reduce the overall RTO. Further, by dynamically switching between synchronous and asynchronous replication of data based on resource consumption, the present disclosure provides a mechanism to ensure optimum utilization of those resources without overwhelming those resources.

In some embodiments, if resource consumption permits, the migration controller 225 may start asynchronously replicating data of one or more virtual machines in the initial stage while migrating another virtual machine in the initial stage and/or while synchronously replicating the data of one or more virtual machines in the later stage. For example, in some embodiments, while migrating VM1, the migration controller 225 may start synchronously replicating the data of one or more virtual machines in the later stage (e.g., VM6, VM7, etc.) and/or start asynchronously replicating the data of additional one or more virtual machines in the initial stage (e.g., VM2, VM3, etc.). In some embodiments, the determination of whether to replicate additional virtual machines of the initial stage in the asynchronous mode may be based upon determining the amount of resources that remain available after the synchronous replication of virtual machine(s) in the later stage has begun. For example, if VM1 is being migrated using asynchronous replication and data of VM6 is being replicated using synchronous replication, the migration controller 225 may determine that there are not enough system resources available to start replicating data of VM7 in a synchronous mode. However, the migration controller 225 may determine that those system resources are enough to start replicating the data of VM2 in an asynchronous mode. Thus, the migration controller 225 may start asynchronously replicating the data of VM2 along with migrating VM1 and synchronously replicating the data of VM6. Once the migration of VM1 is complete, the migration controller 225 may start migrating VM2 in an asynchronous mode, while continuing to replicate data of one or more virtual machines in the later stage synchronously depending upon system resources. If VM2's data was already being asynchronously replicated, when the migration of VM2 is actually begun, only some of the data now needs to be replicated, allowing the VM2 to be migrated quicker and reducing the overall RTO.

Thus, by continuously monitoring resource consumption, the migration controller 225 may adjust the number of virtual machines that are being replicated synchronously and asynchronously to dynamically adjust RTO. It is to be understood that synchronously replicating data of virtual machines in the later stage is different than taking latest snapshots of the virtual machines in later stage since it is not known when the recovery (e.g., migration) of the virtual machines in the initial stage will be over, and some amount of data will remain to be replicated when the recovery of the virtual machines in the later stage is begun. By replicating the data of the virtual machines in the later stage synchronously solves this issue because when the time comes to recover (e.g., migrate) the virtual machines in the later stage, all of their data is already on the target site 210. The process 400 ends at operation 435.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   determining, by a migration controller, a first subset of a plurality of virtual machines (VMs) and a different second subset of the plurality of VMs based on a recovery plan, wherein the first subset to be migrated based on an asynchronous mode of replication and the second subset to be replicated based on a synchronous mode of replication, and wherein the first subset includes a first VM and a third VM and the second subset includes a second VM;
   migrating, by the migration controller, the first VM of the first subset of VMs from a source site to a target site in a virtual computing system based on the asynchronous mode of replication, wherein migrating the first VM includes replicating the first VM from the source site to the target site, powering off the first VM at the source site, and powering on the first VM at the target site;
   replicating, by the migration controller, data of the second VM of the second subset of VMs from the source site to the target site based on the synchronous mode of replication, wherein the replication of the data of the second VM is performed in parallel with the migration of the first VM;
   subsequent to the parallel migrating and replication of at least one VM of the first subset and second subset, determining whether a resource consumption of the virtual computing system is less than or equal to a predetermined threshold;
   based on the resource consumption being less than or equal to the predetermined threshold, modifying the first subset and the second subset to move the third VM from the first subset to the second subset and migrating, by the migration controller, the third VM from the source site to the target site in the virtual computing system based on the synchronous mode of replication.

2. The method of claim 1, further comprising migrating, by the migration controller, VMs in the first set of VMs and the second set of VMs in accordance with the recovery plan.

3. The method of claim 1, further comprising migrating, by the migration controller, VMs in the first set of VMs and the second set of VMs in a determined order.

4. The method of claim 1, wherein the first VM is migrated to the target site before the second VM is powered off at the source site and powered on at the target site.

5. The method of claim 1, further comprising migrating, by the migration controller, a fourth VM of the first subset of VMs to the target site based on the asynchronous mode of replication upon completing migration of the first VM.

6. The method of claim 5, further comprising replicating, by the migration controller, the data of a fifth VM of the second subset of VMs based on the synchronous mode of replication upon completing replication of the second VM.

7. The method of claim 1, further comprising replicating, by the migration controller, the data of a fourth VM of the second subset of VMs based on the synchronous mode of replication in parallel with replicating the data of the second VM.

8. The method of claim 1, further comprising replicating, by the migration controller, the data of a fourth VM of the first subset of VMs based on the asynchronous mode of replication in parallel with the migration of the first entity.

9. The method of claim 1, further comprising dividing a plurality of VMs into an initial stage and a later stage, wherein the first subset of VMs are part of the initial stage and the second subset of VMs are part of the later stage.

10. A system comprising:
a migration controller comprising:
a memory having computer-readable instructions stored thereon; and a processor that executes the computer-readable instructions to:
determine a first subset of a plurality of virtual machines (VMs) and a different second subset of the plurality of VMs based on a recovery plan, wherein the first subset to be migrated based on an asynchronous mode of replication and the second subset to be replicated based on a synchronous mode of replication, and wherein the first subset includes a first VM and a third VM and the second subset includes a second VM; and
migrate the first VM of the first subset of VMs from a source site to a target site in a virtual computing system based on the asynchronous mode of replication, wherein migrating the first VM includes replicating the first VM from the source site to the target site, powering off the first VM at the source site, and powering on the first VM at the target site;
replicate data of the second VM of the second subset of VMs from the source site to the target site based on the synchronous mode of replication, wherein the replication of the data of the second VM is performed in parallel with the migration of the first VM;
subsequent to the parallel migrating and replication of at least one VM of the first subset and the second subset, determine whether a resource consumption of the virtual computing system is less than or equal to a predetermined threshold;
based on the resource consumption being less than or equal to the predetermined threshold, modify the first subset and the second subset to move the third VM from the first subset to the second subset and migrate the third VM from the source site to the target site in the virtual computing system based on the synchronous mode of replication.

11. The system of claim 10, wherein the processor further executes computer-readable instructions to determine an order in which VMs of the first set of VMs and the second set of VMs are to be migrated.

12. The system of claim 11, wherein the order is based upon the recovery plan.

13. The system of claim 10, wherein the processor further executes computer-readable instructions to determine that a resource consumption of a resource is less than or equal to a predetermined threshold before replicating the data of the second VM based on the synchronous mode of replication.

14. The system of claim 13, wherein the resource comprises at least one of network bandwidth, input/output latency, CPU utilization, or memory utilization.

15. The system of claim 10, wherein the processor further executes computer-readable instructions to replicate the data of at least one additional VM from the first subset of VMs in the asynchronous mode of replication in parallel with the migration of the first VM.

16. The system of claim 15, wherein the at least one additional VM is migrated upon completion of the migration of the first VM.

17. A non-transitory computer-readable media comprising computer-readable instructions stored thereon that when executed by a processor in a virtual computing system cause the processor to:
determine a first subset of a plurality of virtual machines (VMs) and a different second subset of the plurality of VMs based on a recovery plan, wherein the first subset to be migrated based on an asynchronous mode of replication and the second subset to be replicated based on a synchronous mode of replication, and wherein the first subset includes a first VM and a third VM and the second subset includes a second VM;
migrate the first VM of the first subset of VMs from a source site to a target site in a virtual computing system based on the asynchronous mode of replication, wherein migrating the first VM includes replicating the first VM from the source site to the target site, powering off the first VM at the source site, and powering on the first VM at the target site;
replicate data of the second VM of the second subset of VMs from the source site to the target site based on the synchronous mode of replication in parallel with the migration of the first VM for dynamically adjusting a recovery time objective parameter;
subsequent to the parallel migrating and replication of at least one VM of the first subset and second subset, determine whether a resource consumption of the virtual computing system is less than or equal to a predetermined threshold;
based on the resource consumption being less than or equal to the predetermined threshold, modify the first subset and the second subset to move the third VM from the first subset to the second subset and migrate the third VM from the source site to the target site in the virtual computing system based on the synchronous mode of replication.

18. The non-transitory computer-readable media of claim 17, wherein the processor further executes computer-readable instructions to determine that a resource consumption of a resource is less than or equal to a predetermined threshold before replicating the data of the second VM via the synchronous mode of replication.

19. The non-transitory computer-readable media of claim 17, wherein the processor further executes computer-readable instructions to migrate VMs in the first subset of VMs and the second set of VMs in a designated order.

20. A method comprising:
monitoring, by a migration controller, resource consumption of system resources;
determining, by a migration controller, a first subset of a plurality of virtual machines (VMs) to be replicated based on a synchronous mode of replication and a different second subset of the plurality of VMs to be replicated based on an asynchronous mode of replication, the first and second subsets determined based on a priority order of the plurality of VMs in a recovery plan and the resource consumption of the system resources, wherein the first subset includes a first VM and the second subset includes a second VM and a third VM;

replicating, by the migration controller, data of the first VM of the first subset of VMs from a source site to a target site based on the synchronous mode of replication in anticipation of a failover event;
in response to the failover event, migrating the first VM of the first subset of VMs from a source site to a target site in a virtual computing system, wherein migrating the first VM includes powering off the first VM at the source site and powering on the first VM at the target site;
in response to the failover event, migrating, by the migration controller, the second VM of the second subset of VMs from the source site to the target site in the virtual computing system based on the asynchronous mode of replication, wherein migrating the second VM includes replicating the second VM from the source site to the target site based on the asynchronous mode of replication, powering off the second VM at the source site, and powering on the second VM at the target site;
subsequent to the migrating and replication of at least one VM of the first subset and second subset, determining whether a resource consumption of the virtual computing system is less than or equal to a predetermined threshold;
based on the resource consumption being less than or equal to the predetermined threshold, modifying, by the migration controller, the first subset and the second subset prior to the failover event to move the third VM from the second subset to the first subset and migrating, by the migration controller, the third VM from the source site to the target site in the virtual computing system based on the synchronous mode of replication.

* * * * *